US012684546B2

(12) United States Patent
    Liu et al.

(10) Patent No.:    US 12,684,546 B2
(45) Date of Patent:      Jul. 14, 2026

(54) DATA TRANSMISSION METHOD AND COMMUNICATION APPARATUS

(71) Applicant: HUAWEI TECHNOLOGIES CO., LTD., Shenzhen (CN)

(72) Inventors: Chenchen Liu, Shenzhen (CN); Mingjiang Wu, Chengdu (CN); Xianfu Lei, Chengdu (CN); Xiaohu Tang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 18/438,651

(22) Filed: Feb. 12, 2024

(65) Prior Publication Data

US 2024/0188059 A1      Jun. 6, 2024

Related U.S. Application Data

(63) Continuation of application No. PCT/CN2022/110750, filed on Aug. 8, 2022.

(30) Foreign Application Priority Data

Aug. 13, 2021    (CN) .......................... 202110931013.0

(51) Int. Cl.
     *H04W 72/0453*      (2023.01)
     *H04L 27/26*         (2006.01)
     *H04W 72/542*       (2023.01)
(52) U.S. Cl.
     CPC ..... *H04W 72/0453* (2013.01); *H04L 27/2634* (2013.01); *H04W 72/542* (2023.01)

(58) Field of Classification Search
     CPC . H04L 1/0071; H04L 5/0044; H04L 27/2634; H04L 5/0041; H04L 27/2602;
     (Continued)

(56) References Cited

U.S. PATENT DOCUMENTS

2016/0128005 A1      5/2016  Chen et al.
2018/0160429 A1*    6/2018  Seok .................... H04L 1/0075
                                  (Continued)

FOREIGN PATENT DOCUMENTS

CN          110912668 A        3/2020
CN          111247849 A        6/2020

OTHER PUBLICATIONS

LAN/MAN Standards Committee of the IEEE Computer Society:"IEEE P802.11ax™M/D8.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN." IEEE P802.11ax™M/D8.0, Oct. 2020. total 820 pages.

(Continued)

*Primary Examiner* — Brian D Nguyen

(57)                    ABSTRACT

A data transmission method and a communication apparatus are disclosed. The method includes: A first device receives a trigger frame, where the trigger frame indicates a resource unit (RU) allocated to the first device; and the first device sends first data to a second device, where the first data occupies a discrete subcarrier in the RU. In this way, the transmit power of a subcarrier can be increased, and the transmission performance can be ensured.

13 Claims, 4 Drawing Sheets

| First device | | Second device |
|---|---|---|

201: Send a trigger frame, where the trigger frame indicates an RU allocated to the first device 202: Send first data to the second device, where the first data occupies a discrete subcarrier in the RU

(58) Field of Classification Search
CPC . H04L 5/0007; H04L 5/0094; H04L 27/2628;
H04W 72/542; H04W 72/0453; H04W
84/12
See application file for complete search history.

(56) References Cited

U.S. PATENT DOCUMENTS

| | | | |
|---|---|---|---|
| 2019/0137596 A1* | 5/2019 | Silverman ................. | G01S 5/06 |
| 2020/0014509 A1 | 1/2020 | Asterjadhi et al. | |
| 2021/0282132 A1* | 9/2021 | Monajemi ............. | H04L 5/0035 |
| 2023/0261819 A1* | 8/2023 | Park ........................ | H04L 5/001 |
| | | | 370/329 |
| 2024/0195550 A1* | 6/2024 | Park ..................... | H04L 5/0092 |
| 2024/0322965 A1* | 9/2024 | Park ................. | H04W 72/0453 |
| 2025/0266869 A1* | 8/2025 | Park ........................ | H04L 27/26 |

OTHER PUBLICATIONS

Federal Communications Commission. FCC 20-51. Apr. 23, 2020.
[online] https://docs.fcc.gov/public/attachments/FCC-20-51A1.pdf.
total 142 pages.
International Search Report and Written Opinion issued in PCT/
CN2022/110750, dated Nov. 10, 2022, 11 pages.
Extended European Search Report issued in EP22855365.7, dated
Oct. 22, 2024, 9 pages.

* cited by examiner

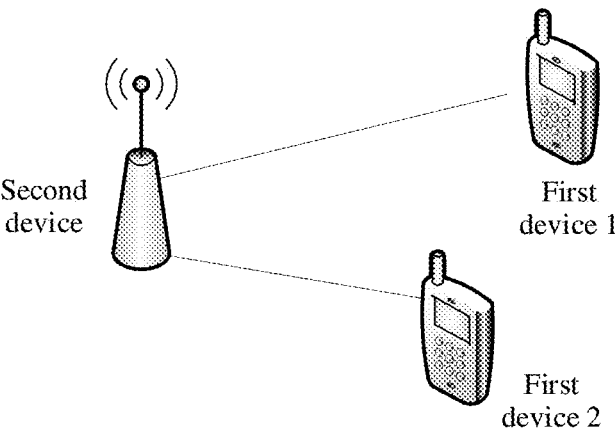

Second
device

First
device 1

First
device 2

FIG. 1

First device                                          Second device

201: Send a trigger frame, where the trigger frame
indicates an RU allocated to the first device 202: Send first data to the second device, where the first
data occupies a discrete subcarrier in the RU

FIG. 2

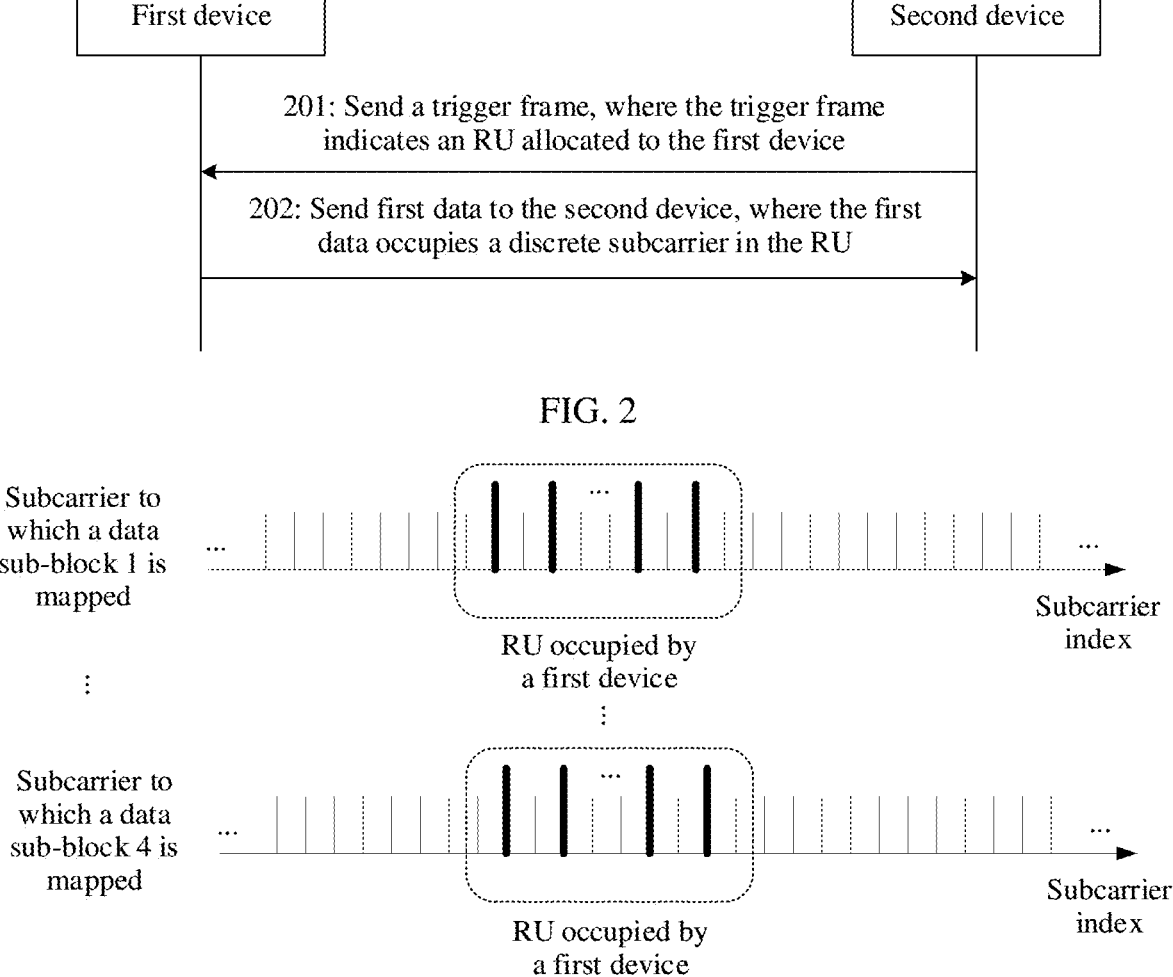

Subcarrier to
which a data
sub-block 1 is
mapped

RU occupied by
a first device

Subcarrier
index

Subcarrier to
which a data
sub-block 4 is
mapped

RU occupied by
a first device

Subcarrier
index

DATA TRANSMISSION METHOD AND COMMUNICATION APPARATUS

CROSS-REFERENCE TO RELATED APPLICATIONS

This application is a continuation of International Application No. PCT/CN2022/110750, filed on Aug. 8, 2022, which claims priority to Chinese Patent Application No. 202110931013.0, filed on Aug. 13, 2021. The disclosures of the aforementioned applications are hereby incorporated by reference in their entireties.

TECHNICAL FIELD

This application relates to the field of communication technologies, and in particular, to a data transmission method and a communication apparatus.

BACKGROUND

WLAN has been developed for many generations, including 802.11a/b/g, 802.11n, 802.11ac, 802.11ax, and 802.11be that is being discussed. The 802.11n standard is referred to as high throughput (HT), the 802.11ac standard is referred to as very high throughput (very high throughput, VHT), the 802.11ax standard is referred to as high efficient (HE), and the 802.11be standard is referred to as extremely high throughput (EHT).

In terms of bandwidth configuration, the 802.11ax currently supports the following bandwidth configurations: 20 MHz (megahertz), 40 MHz, 80 MHz, 160 MHz, and 80+80 MHz. A difference between 160 MHz and 80+80 MHz is that the former is a continuous frequency band, while two 80 MHz in the latter may be separated. In the 802.11be, 320 MHz is supported.

Recently, the Federal Communications Commission of the United States issued a regulation on 6 GHz (gigahertz) spectrums, which defines a low power indoor (LPI) communication manner and strictly limits a maximum transmit power and a maximum transmit frequency spectral density. For an access point (AP), a maximum power is 36 dBm (decibel-milliwatts) and a maximum power spectral density is 5 dBm/MHz (decibel-milliwatts/megahertz). For a station (STA), a maximum power is 24 dBm and a maximum power spectral density is −1 dBm/MHz. A transmit power of a device is restricted by both a maximum power and a maximum power spectral density. That is, the transmit power of the device cannot exceed the maximum power or the maximum power spectral density (the transmit power per MHz cannot exceed a specified value).

Therefore, when a power spectral density is limited, if a transmit power of data needs to be increased, the transmit power may be increased by expanding a transmit bandwidth corresponding to the data, that is, scattering a subcarrier carrying the data. As shown in FIG. 1, to increase the transmit power, the subcarrier carrying the data may be dispersed in a larger bandwidth, that is, scattered in the larger bandwidth. The larger bandwidth means that a bandwidth obtained after the subcarrier is scattered is greater than a resource unit (RU) occupied by STA. However, this operation may allocate data to a subcarrier in deep fading (namely, poor channel quality), resulting in reduced data transmission performance.

SUMMARY

Embodiments of this application provide a data transmission method and a communication apparatus, to help improve data transmission performance.

According to a first aspect, this application provides a data transmission method. The method includes: A first device receives a trigger frame, where the trigger frame indicates a resource unit (RU) allocated to the first device; and the first device sends first data to a second device, where the first data occupies a discrete subcarrier in the RU.

Based on the method described in the first aspect, the transmit power of a subcarrier can be increased, and the transmission performance can be ensured.

In a possible implementation, a specific implementation in which the first device sends first data to a second device is as follows: The first device divides the first data into M data sub-blocks, where M is greater than 1, M is less than N, and N is a quantity of subcarriers in the RU; the first device maps each of the M data sub-blocks to K discrete subcarriers in the RU respectively, to obtain subcarrier data corresponding to the M data sub-blocks, where K is equal to N divided by M; the first device performs inverse fast Fourier transform IFFT on the subcarrier data corresponding to the M data sub-blocks, to obtain M pieces of first time-domain data; and the first device sends the M pieces of first time-domain data.

Based on this possible implementation, information in an original RU can be distributed to a plurality of OFDM symbols for transmission, and time domain diversity can be increased.

In a possible implementation, a specific implementation in which the first device sends first data to a second device is as follows: The first device divides the first data into M data sub-blocks, where M is greater than 1, M is less than N, and N is a quantity of subcarriers in the RU; the first device maps each of the M data sub-blocks to K discrete subcarriers in the RU respectively, to obtain subcarrier data corresponding to the M data sub-blocks, where K is equal to N divided by M. The first device performs inverse fast Fourier transform IFFT on the subcarrier data corresponding to the M data sub-blocks, to obtain M pieces of first time-domain data; the first device divides each of the M pieces of first time-domain data into blocks, where each piece of first time-domain data corresponds to M data blocks; the first device obtains M pieces of second time-domain data based on data blocks corresponding to the M pieces of first time-domain data, where an $i^{th}$ piece of second time-domain data in the M pieces of second time-domain data is obtained by combining an $i^{th}$ data block of each piece of first time-domain data, and i is greater than 0 and less than or equal to M; and the first device sends the M pieces of second time-domain data.

In this possible implementation, a block division method and an interleaving method are provided for corresponding time-domain data obtained after frequency domain dispersion. In this method, transmission performance may be further improved by using a time diversity gain.

In a possible implementation, the M data sub-blocks include a first data sub-block and a second data sub-block, and the first data sub-block and the second data sub-block are mapped to different K subcarriers. Based on this possible implementation, frequency domain diversity can be increased, and transmission performance can be improved.

In a possible implementation, all of the M data sub-blocks are mapped to same K subcarriers, and the K subcarriers are subcarriers with best channel quality in the RU. Based on this possible implementation, data can be effectively prevented from being allocated to a deep fading subcarrier, thereby increasing a transmission throughput of an entire network.

In a possible implementation, the RU is allocated to a plurality of first devices, and data sent by different first devices occupies different K subcarriers in the RU. Based on this possible implementation, a same RU may be simultaneously allocated to different users, thereby further increasing the number of access users and increasing the throughput rate.

In a possible implementation, the trigger frame further indicates a subcarrier set occupied by the first device for sending the first data. Based on this possible implementation, a subcarrier occupied by the first device for sending data can be more flexible.

In a possible implementation, in a bandwidth corresponding to the RU, any consecutive 1-megahertz bandwidth includes a same quantity of subcarriers in the K subcarriers. Based on this possible implementation, a transmit power of each subcarrier may reach a maximum value by enabling a quantity of subcarriers of each MHz to be the same.

According to a second aspect, this application provides a data transmission method. The method includes: A second device sends a trigger frame, where the trigger frame indicates a resource unit (RU) allocated to a first device; and the second device receives first data sent by the first device, where the first data occupies a discrete subcarrier in the RU.

In a possible implementation, a specific implementation in which the second device receives first data sent by the first device is as follows: The second device receives M pieces of first time-domain data from the first device; the second device performs fast Fourier transform (FFT) on the M pieces of first time-domain data, to obtain subcarrier data corresponding to M data sub-blocks of the first data; and the second device obtains the M data sub-blocks based on the subcarrier data corresponding to the M data sub-blocks.

In a possible implementation, a specific implementation in which the second device receives first data sent by the first device is as follows: The second device receives M pieces of second time-domain data from the first device; the second device divides each of the M pieces of second time-domain data into blocks, where each piece of second time-domain data corresponds to M data blocks; the second device obtains M pieces of first time-domain data based on data blocks corresponding to the M pieces of second time-domain data, where an $i^{th}$ piece of first time-domain data in the M pieces of first time-domain data is obtained by combining an $i^{th}$ data block of each piece of second time-domain data, and i is greater than 0 and less than or equal to M; the second device performs fast Fourier transform (FFT) on the M pieces of first time-domain data, to obtain subcarrier data corresponding to M data sub-blocks of the first data; and the second device obtains the M data sub-blocks based on the subcarrier data corresponding to the M data sub-blocks.

In a possible implementation, the M data sub-blocks include a first data sub-block and a second data sub-block, and the first data sub-block and the second data sub-block are mapped to different K subcarriers.

In a possible implementation, all of the M data sub-blocks are mapped to same K subcarriers, and the K subcarriers are subcarriers with best channel quality in the RU.

In a possible implementation, the RU is allocated to a plurality of first devices, and data sent by different first devices occupies different K subcarriers in the RU.

In a possible implementation, the trigger frame further indicates a subcarrier set occupied by the first device for sending the first data.

In a possible implementation, in a bandwidth corresponding to the RU, any consecutive 1-megahertz bandwidth includes a same quantity of subcarriers in the K subcarriers.

Beneficial effects of the second aspect are the same as beneficial effects of the first aspect. For beneficial effects of the second aspect, refer to the beneficial effects corresponding to the first aspect.

According to a third aspect, this application provides a data transmission method. The method includes: A first device receives a trigger frame, where the trigger frame indicates a resource unit (RU) allocated to the first device; and the first device transmits data within a bandwidth corresponding to the RU by using an HT PPDU or a VHT PPDU.

Based on the method described in the third aspect, the transmit power of a subcarrier can be increased, and the transmission performance can be ensured.

According to a fourth aspect, this application provides a data transmission method. The method includes: A second device sends a trigger frame, where the trigger frame indicates a resource unit (RU) allocated to a first device; and the second device receives data sent by the first device by using an HT PPDU or a VHT PPDU within a bandwidth corresponding to the RU.

According to a fifth aspect, this application provides a communication apparatus. The communication apparatus may be a first device, or may be an apparatus in the first device, or may be an apparatus that can be used in a matching manner with the first device. The communication apparatus may alternatively be a chip system. The communication apparatus may perform the method according to the first aspect or the third aspect. A function of the communication apparatus may be implemented by hardware, or may be implemented by hardware by executing corresponding software. The hardware or software includes one or more units or modules corresponding to the foregoing function. The unit or module may be software and/or hardware. For operations performed by the communication apparatus and beneficial effects thereof, refer to the method and beneficial effects in the first aspect or the third aspect.

According to a sixth aspect, this application provides a communication apparatus. The communication apparatus may be a second device, or may be an apparatus in the second device, or may be an apparatus that can be used in a matching manner with the second device. The communication apparatus may alternatively be a chip system. The communication apparatus may perform the method according to the second aspect or the fourth aspect. A function of the communication apparatus may be implemented by hardware, or may be implemented by hardware by executing corresponding software. The hardware or software includes one or more units or modules corresponding to the foregoing function. The unit or module may be software and/or hardware. For operations performed by the communication apparatus and beneficial effects thereof, refer to the method and beneficial effects in the second aspect or the fourth aspect.

According to a seventh aspect, this application provides a communication apparatus. The communication apparatus includes a processor, and when the processor invokes a computer program in a memory, the method according to any one of the first aspect to the fourth aspect is performed.

According to an eighth aspect, this application provides a communication apparatus. The communication apparatus includes a processor and a memory. The processor is coupled to the memory, and the processor is configured to implement the method according to any one of the first aspect to the fourth aspect.

According to a ninth aspect, this application provides a communication apparatus. The communication apparatus includes a processor, a memory, and a transceiver. The processor is coupled to the memory, the transceiver is configured to receive and send data, and the processor is configured to implement the method according to any one of the first aspect to the fourth aspect.

According to a tenth aspect, this application provides a chip. The communication apparatus includes a processor and an interface. The interface is configured to receive or output a signal, and the processor is configured to execute code instructions, so that the method according to any one of the first aspect to the fourth aspect is performed.

According to an eleventh aspect, this application provides a computer-readable storage medium, where the storage medium stores a computer program or instructions. When the computer program or the instructions are executed by a communication apparatus, the method according to any one of the first aspect to the fourth aspect is implemented.

According to a twelfth aspect, this application provides a computer program product including instructions. When a computer reads and executes the computer program product, the computer is enabled to perform the method according to any one of the first aspect to the fourth aspect.

According to a thirteenth aspect, this application provides a communication system, where the communication system includes a first device and a second device. The first device is configured to perform the method according to the first aspect, and the second device is configured to perform the method according to the second aspect. Alternatively, the first device is configured to perform the method according to the third aspect, and the second device is configured to perform the method according to the fourth aspect.

BRIEF DESCRIPTION OF DRAWINGS

FIG. 1 is a schematic diagram of a communication system;

FIG. 2 is a schematic flowchart of an example data transmission method according to an embodiment of this application;

FIG. 3 is a schematic diagram of mapping a data sub-block to an example subcarrier according to an embodiment of this application;

DESCRIPTION OF EMBODIMENTS

Figures 4, 5:
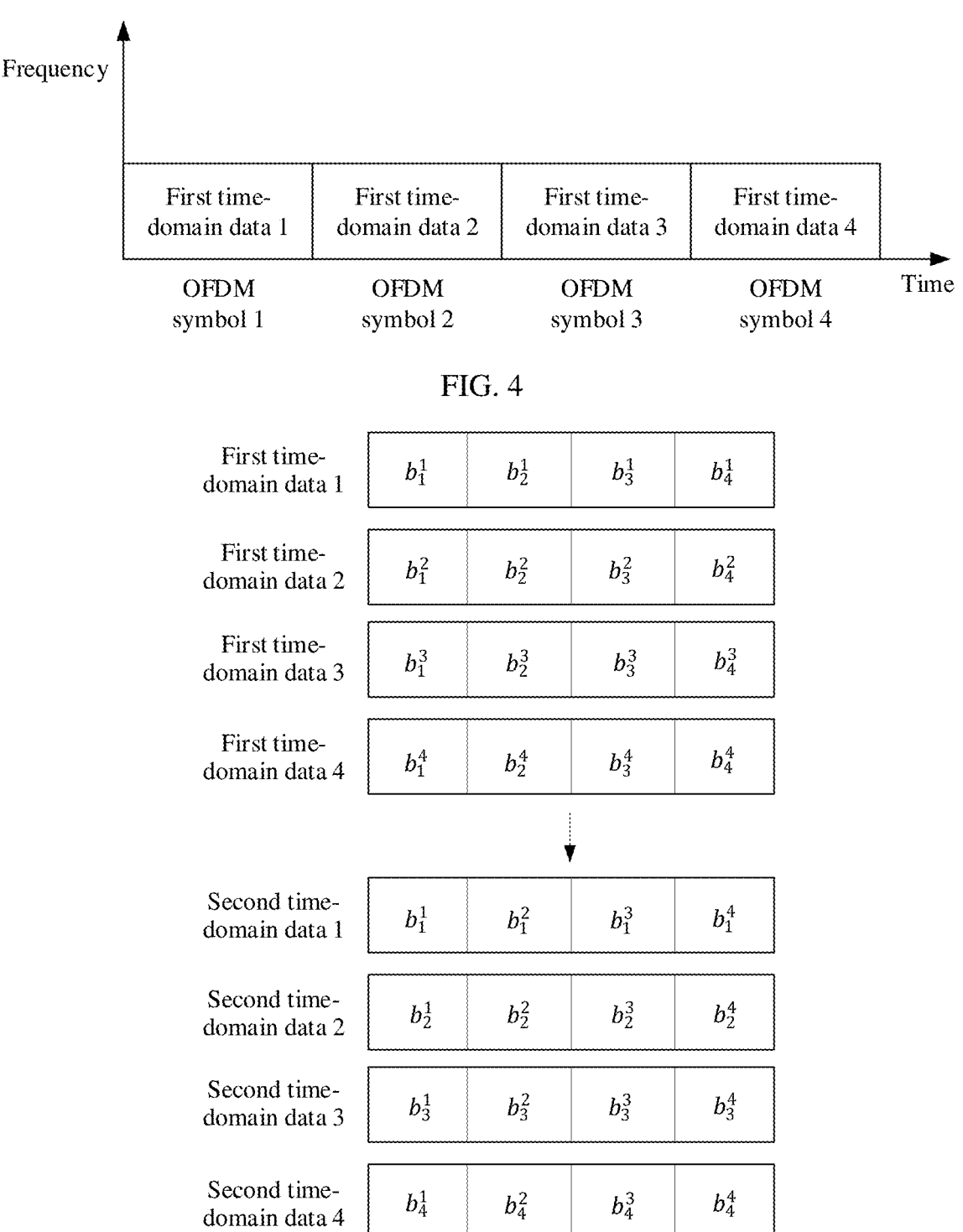
FIG. 4 is a schematic diagram of example first time-domain data according to an embodiment of this application.
FIG. 5 is a schematic diagram of example first time-domain data and example second time-domain data according to an embodiment of this application.

In the specification, claims, and accompanying drawings of this application, terms "first", "second", and the like are intended to distinguish between different objects but do not indicate a particular order. In addition, the terms "including/comprising" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that embodiments described in this specification may be combined with another embodiment.

For ease of understanding the solutions described in embodiments of this application, the following first describes a system architecture in embodiments of this application.

It should be noted that the technical solutions in embodiments of this application may be applied to a wireless local area network WLAN that uses 802.11be or a standard after 802.11be, and may be further applied to another communication system that supports large bandwidth orthogonal frequency division multiplexing (OFDM) transmission.

FIG. 1 is a schematic diagram of an example system architecture according to an embodiment of this application. As shown in FIG. 1, the system architecture may include a first device and a second device. The first device may be a non-access point station (non-AP STA), and the second device may be an access point (AP) station. Alternatively, both the first device and the second device are non-AP STAs. For ease of description, in this specification, the access point station is referred to as access point (AP), and the non-access point station is referred to as station (STA). The system architecture may include one or more first devices and one or more second devices. FIG. 1 shows an example in which one second device and two first devices are included.

The access point may be an access point used by a terminal device (such as a mobile phone) to access a wired (or wireless) network, and is mainly deployed at home, in a building, and in a park. A typical coverage radius is tens of meters to hundreds of meters. Certainly, the access point may alternatively be deployed outdoors. The access point is equivalent to a bridge that connects the wired network and the wireless network. A main function of the access point is to connect various wireless network clients together and then connect the wireless network to the Ethernet. Specifically, the access point may be a terminal device (such as a mobile phone) or a network device (such as a router) with a wireless-fidelity (Wi-Fi) chip. The access point may be a device that supports the 802.11be standard. Alternatively, the access point may be a device that supports a plurality of wireless local area network (WLAN) standards of the 802.11 family such as the 802.11be standard, the 802.11ax standard, the 802.11ac standard, the 802.11n standard, the 802.11g standard, the 802.11b standard, and the 802.11a standard. The access point in this application may be a high efficient (HE) AP or an extremely high throughput (EHT) AP, or may be an access point applicable to a future generation of Wi-Fi standard.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, a computer supporting a Wi-Fi communication function, or the like. Optionally, the station may support the 802.11be standard. The station may also support a plurality of wireless local area network (WLAN) standards of the 802.11 family such as the 802.11be standard, the 802.11ax standard, the 802.11ac standard, the 802.11n standard, the 802.11g standard, the 802.11b standard, and the 802.11a standard.

For example, the access point and the station may be devices applied in the Internet of vehicles, nodes and sensors or the like in the Internet of things (IoT), smart cameras, smart remote controls, smart water or electricity meters, or the like in a smart home, sensors in a smart city, and the like.

In this embodiment of this application, the first device and the second device may perform data transmission in an LPI mode. Alternatively, the first device and the second device may perform data transmission in another mode.

FIG. 2 is a schematic flowchart of an example data transmission method according to an embodiment of this application. As shown in FIG. 2, the method applied to data transmission includes the following step 201 and step 202. The method shown in FIG. 2 may be performed by a first device and a second device. Alternatively, the method shown in FIG. 2 may be performed by a chip in the first device and a chip in the second device. FIG. 2 is described by using an example in which the first device and the second device are execution bodies.

201: The second device sends a trigger frame, where the trigger frame indicates a resource unit (RU) allocated to the first device. Correspondingly, the first device may receive the trigger frame.

202: The first device sends first data to the second device, where the first data occupies a discrete subcarrier in the RU. Correspondingly, the second device may receive the first data.

In this embodiment of this application, after receiving the trigger frame, the first device selects the discrete subcarrier from the RU allocated to the first device, to send the first data. In other words, the first device sends the first data by using only inconsecutive subcarriers in the RU.

Because a discrete subcarrier in the RU is used to transmit data, a quantity of subcarriers for sending data per MHz can be reduced, a total transmit power per MHz remains unchanged, and a larger transmit power may be obtained from a subcarrier perspective. In addition, because the subcarriers in the RU allocated to the first device have relatively good channel quality, the discrete subcarrier in the RU allocated to the first device is selected to transmit data, so that the transmit power of the subcarriers can be increased, and the transmission quality can be ensured.

There are the following two specific implementations in which the first device sends the first data to the second device and the second device receives the first data sent by the first device:

1. A specific implementation in which the first device sends the first data to the second device is as follows:

The first device divides the first data into M data sub-blocks, where M is greater than 1, M is less than N, and N is a quantity of subcarriers in the RU allocated to the first device. The first device maps each of the M data sub-blocks to K discrete subcarriers in the RU respectively, to obtain subcarrier data corresponding to the M data sub-blocks, where K is equal to N divided by M. The first device performs inverse fast Fourier transform (IFFT) on the subcarrier data corresponding to the M data sub-blocks, to obtain M pieces of first time-domain data. The first device sends the M pieces of first time-domain data.

A specific implementation in which the second device receives the first data sent by the first device is as follows:

The second device receives M pieces of first time-domain data from the first device. The second device performs fast Fourier transform (FFT) on the M pieces of first time-domain data, to obtain subcarrier data corresponding to M data sub-blocks of the first data. The second device obtains the M data sub-blocks based on the subcarrier data corresponding to the M data sub-blocks.

For example, it is assumed that the first device divides the to-be-sent first data into four parts, namely, a data sub-block 1 to a data sub-block 4. The RU allocated to the first device includes 52 subcarriers. In this case, K is 13. As shown in FIG. 3, lengthened subcarriers in black and bold are subcarriers to which a data sub-block is mapped. The first device maps the data sub-block 1 to 13 discrete subcarriers in the RU, to obtain subcarrier data corresponding to the data sub-block 1. The first device maps the data sub-block 2 to 13 discrete subcarriers in the RU, to obtain subcarrier data corresponding to the data sub-block 2. The first device maps the data sub-block 3 to 13 discrete subcarriers in the RU, to obtain subcarrier data corresponding to the data sub-block 3. The first device maps the data sub-block 4 to 13 discrete subcarriers in the RU, to obtain subcarrier data corresponding to the data sub-block 4.

The first device performs IFFT on the subcarrier data corresponding to the data sub-block 1, to obtain first time-domain data 1. The first device performs IFFT on the subcarrier data corresponding to the data sub-block 2, to obtain first time-domain data 2. The first device performs IFFT on the subcarrier data corresponding to the data sub-block 3, to obtain first time-domain data 3. The first device performs IFFT on the subcarrier data corresponding to the data sub-block 4, to obtain first time-domain data 4. As shown in FIG. 4, the first device sequentially sends first time-domain data 1 to the first time-domain data 4. One piece of the first time-domain data may be one OFDM symbol. Optionally, the first device may further sequentially send the first time-domain data 1 to the first time-domain data 4 after adding a cyclic prefix.

Correspondingly, the second device may sequentially receive the first time-domain data 1 to the first time-domain data 4 The second device performs FFT on the first time-domain data 1, to obtain the subcarrier data corresponding to the data sub-block 1. The second device performs FFT on the first time-domain data 2, to obtain the subcarrier data corresponding to the data sub-block 2. The second device performs FFT on the first time-domain data 3, to obtain the subcarrier data corresponding to the data sub-block 3. The second device performs FFT on the first time-domain data 4, to obtain the subcarrier data corresponding to the data sub-block 4. The second device obtains the data sub-block 1 based on the subcarrier data corresponding to the data sub-block 1. The second device obtains the data sub-block 2 based on the subcarrier data corresponding to the data sub-block 2. The second device obtains the data sub-block 3 based on the subcarrier data corresponding to the data sub-block 3. The second device obtains the data sub-block 4 based on the subcarrier data corresponding to the data sub-block 4.

Based on Manner 1, information in an original RU can be distributed to a plurality of OFDM symbols for transmission, and time domain diversity can be increased.

2. A specific implementation in which the first device sends first data to a second device is as follows:

The first device divides the first data into M data sub-blocks, where M is greater than 1, M is less than N, and N is a quantity of subcarriers in the RU. The first device maps each of the M data sub-blocks to K discrete subcarriers in the RU respectively, to obtain subcarrier data corresponding to the M data sub-blocks, where K is equal to N divided by M. The first device performs IFFT on the subcarrier data corresponding to the M data sub-blocks, to obtain M pieces of first time-domain data. The first device divides each of the M pieces of first time-domain data into blocks, where each piece of first time-domain data corresponds to M data sub-blocks. The first device obtains M pieces of second time-domain data based on data blocks corresponding to the M pieces of first time-domain data, where an $i^{th}$ piece of second time-domain data in the M pieces of second time-domain data is obtained by combining an $i^{th}$ data block of each piece of first time-domain data, and i is greater than 0 and less than or equal to M. The first device sends the M pieces of second time-domain data.

Correspondingly, a specific implementation in which the second device receives the first data sent by the first device is as follows:

The second device receives M pieces of second time-domain data from the first device. The second device divides each of the M pieces of second time-domain data into blocks, where each piece of second time-domain data corresponds to M data blocks. The second device obtains M pieces of first time-domain data based on data blocks corresponding to the M pieces of second time-domain data, where an $i^{th}$ piece of first time-domain data in the M pieces of first time-domain data is obtained by combining an $i^{th}$ data block of each piece of second time-domain data, and i is greater than 0 and less than or equal to M. The second device performs fast Fourier transform (FFT) on the M pieces of first time-domain data, to obtain subcarrier data corresponding to M data sub-blocks of the first data. The second device obtains the M data sub-blocks based on the subcarrier data corresponding to the M data sub-blocks.

For example, it is assumed that the first device divides the to-be-sent first data into four parts, namely, a data sub-block 1 to a data sub-block 4. The RU allocated to the first device includes 52 subcarriers. In this case, K is 13. As shown in FIG. 3, the first device maps the data sub-block 1 to 13 discrete subcarriers in the RU, to obtain subcarrier data corresponding to the data sub-block 1. The first device maps the data sub-block 2 to 13 discrete subcarriers in the RU, to obtain subcarrier data corresponding to the data sub-block 2. The first device maps the data sub-block 3 to 13 discrete subcarriers in the RU, to obtain subcarrier data corresponding to the data sub-block 3. The first device maps the data sub-block 4 to 13 discrete subcarriers in the RU, to obtain subcarrier data corresponding to the data sub-block 4.

The first device performs IFFT on the subcarrier data corresponding to the data sub-block 1, to obtain first time-domain data 1. The first device performs IFFT on the subcarrier data corresponding to the data sub-block 2, to obtain first time-domain data 2. The first device performs IFFT on the subcarrier data corresponding to the data sub-block 3, to obtain first time-domain data 3. The first device performs IFFT on the subcarrier data corresponding to the data sub-block 4, to obtain first time-domain data 4.

As shown in FIG. 5, the first device divides the first time-domain data 1 into four data blocks, namely, $$b_1^1, b_2^1, b_3^1, \text{ and } b_4^1.$$

The first device divides the first time-domain data 2 into four data blocks, namely, $$b_1^2, b_2^2, b_3^2, \text{ and } b_4^2.$$

The first device divides the first time-domain data 3 into four data blocks, namely, $$b_1^3, b_2^3, b_3^3, \text{ and } b_4^3.$$

The first device divides the first time-domain data 4 into four data blocks, namely, $$b_1^4, b_2^4, b_3^4, \text{ and } b_4^4.$$

As shown in FIG. 5, the first device combines $$b_1^1, b_1^2, b_1^3, \text{ and } b_1^4$$

to form second time-domain data 1. The first device combines $$b_2^1, b_2^2, b_2^3, \text{ and } b_2^4$$

to form second time-domain data 2. The first device combines $$b_3^1, b_3^2, b_3^3, \text{ and } b_3^4$$

to form second time-domain data 3. The first device combines $$b_4^1, b_4^2, b_4^3, \text{ and } b_4^4$$

to form second time-domain data 4.

Figure 6:
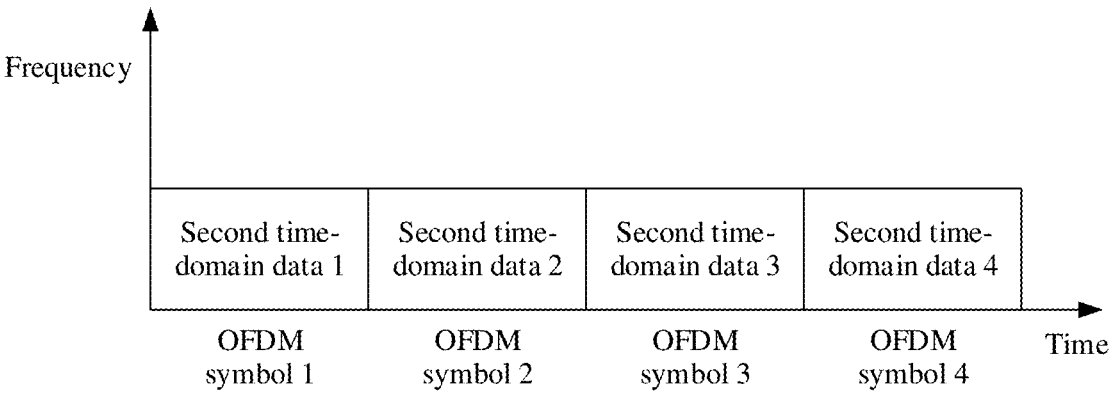
FIG. 6 is a schematic diagram of example second time-domain data according to an embodiment of this application.

As shown in FIG. 6, the first device sequentially sends the second time-domain data 1 to the second time-domain data 4. One piece of second time-domain data may be one OFDM symbol. Optionally, the first device may further sequentially send the second time-domain data 1 to the second time-domain data 4 after adding a cyclic prefix.

Correspondingly, the second device may sequentially receive the second time-domain data 1 to the second time-domain data 4. The second device divides the second time-domain data 1 into four data blocks, namely, $b_1^1$, $b_1^2$, $b_1^3$, and $b_1^4$.

The second device divides the first time-domain data 2 into four data blocks, namely, $b_2^1$, $b_2^2$, $b_2^3$, and $b_2^4$.

The first device divides the first time-domain data 3 into four data sub-blocks, namely, $b_3^1$, $b_3^2$, $b_3^3$, and $b_3^4$.

The first device divides the first time-domain data 4 into four data sub-blocks, namely, $b_4^1$, $b_4^2$, $b_4^3$, and $b_4^4$.

The second device combines $b_1^1$, $b_2^1$, $b_3^1$, and $b_4^1$ to form the first time-domain data 1. The first device combines $b_1^2$, $b_2^2$, $b_3^2$, and $b_4^2$ to form the first time-domain data 2. The first device combines $b_1^3$, $b_2^3$, $b_3^3$, and $b_4^3$ to form the first time-domain data 3. The first device combines $b_1^4$, $b_2^4$, $b_3^4$, and $b_4^4$ to form the first time-domain data 4.

The second device performs FFT on the first time-domain data 1, to obtain the subcarrier data corresponding to the data sub-block 1. The second device performs FFT on the first time-domain data 2, to obtain the subcarrier data corresponding to the data sub-block 2. The second device performs FFT on the first time-domain data 3, to obtain the subcarrier data corresponding to the data sub-block 3. The second device performs FFT on the first time-domain data 4, to obtain the subcarrier data corresponding to the data sub-block 4. The second device obtains the data sub-block 1 based on the subcarrier data corresponding to the data sub-block 1. The second device obtains the data sub-block 2 based on the subcarrier data corresponding to the data sub-block 2. The second device obtains the data sub-block 3 based on the subcarrier data corresponding to the data sub-block 3. The second device obtains the data sub-block 4 based on the subcarrier data corresponding to the data sub-block 4.

Manner 2 provides a block division and an interleaving method for corresponding time-domain data obtained after frequency domain dispersion. In this method, transmission performance may be further improved by using a time diversity gain.

In a possible implementation, the M data sub-blocks include a first data sub-block and a second data sub-block, and the first data sub-block and the second data sub-block are mapped to different K subcarriers. That is, at least two of the M data sub-blocks are mapped to different K subcarriers. Optionally, each of the M data sub-blocks may be mapped to different K subcarriers.

For example, it is assumed that the RU has 16 carriers, and M is 4, then K is 4. The data sub-block 1 may be mapped to a subcarrier 1, a subcarrier 5, a subcarrier 9, and a subcarrier 13. The data sub-block 2 may be mapped to a subcarrier 2, a subcarrier 6, a subcarrier 10, and a subcarrier 14. The data sub-block 3 may be mapped to a subcarrier 3, a subcarrier 7, a subcarrier 11, and a subcarrier 15. The data sub-block 4 may be mapped to a subcarrier 4, a subcarrier 8, a subcarrier 12, and a subcarrier 16.

Based on this possible implementation, frequency domain diversity can be increased, and transmission performance can be improved.

In a possible implementation, each of the M data sub-blocks is mapped to same K subcarriers, and the K subcarriers are subcarriers with best channel quality in the RU.

For example, it is assumed that the RU has 16 carriers, and M is 4, then K is 4. It is assumed that the subcarrier 1, the subcarrier 5, the subcarrier 9, and the subcarrier 13 are K subcarriers with best signal quality in the RU. In this case, the data sub-block 1, the data sub-block 2, the data sub-block 3, and the data sub-block 4 are all mapped to the subcarrier 1, the subcarrier 5, the subcarrier 9, and the subcarrier 13.

Based on this possible implementation, data can be effectively prevented from being allocated to a deep fading subcarrier, thereby increasing a transmission throughput of an entire network.

In still another possible implementation, the RU is allocated to a plurality of first devices, and data sent by different first devices occupies different K subcarriers in the RU. Optionally, the trigger frame further indicates a subcarrier set occupied by the first device for sending the first data.

For example, it is assumed that the RU has 16 carriers, and M is 4, then K is 4. Four data sub-blocks of a first device 1 may be mapped to the subcarrier 1, the subcarrier 5, the subcarrier 9, and the subcarrier 13. Four data sub-blocks of a first device 2 may be mapped to the subcarrier 2, the subcarrier 6, the subcarrier 10, and the subcarrier 14. Four data sub-blocks of a first device 3 may be mapped to the subcarrier 3, the subcarrier 7, the subcarrier 11, and the subcarrier 15. Four data sub-blocks of a first device 4 may be mapped to the subcarrier 4, the subcarrier 8, the subcarrier 12, and the subcarrier 16.

The trigger frame indicates that a subcarrier set occupied by the first device 1 for sending the first data includes the subcarrier 1, the subcarrier 5, the subcarrier 9, and the subcarrier 13. The trigger frame indicates that a subcarrier set occupied by the first device 2 for sending the first data includes the subcarrier 2, the subcarrier 6, the subcarrier 10, and the subcarrier 14. The trigger frame indicates that a subcarrier set occupied by the first device 3 for sending the first data includes the subcarrier 3, the subcarrier 7, the subcarrier 11, and the subcarrier 15. The trigger frame indicates that the subcarrier set occupied by the first device 3 for sending the first data includes the subcarrier 4, the subcarrier 8, the subcarrier 12, and the subcarrier 16.

Based on this possible implementation, a same RU may be simultaneously allocated to different users, thereby further increasing the number of access users and increasing the throughput rate.

In a possible implementation, in a bandwidth corresponding to the RU, any consecutive 1-megahertz bandwidth includes a same quantity of subcarriers in the K subcarriers. That is, subcarriers to which the data sub-blocks are mapped are evenly distributed. For example, it is assumed that K subcarriers to which all data sub-blocks in the M data sub-blocks are mapped are the same, and K is 4. If the bandwidth corresponding to the RU is 4 MHz, each data sub-block is mapped to one subcarrier in a first MHz, one subcarrier in a second MHz, one subcarrier in a third MHz, and one subcarrier in a fourth MHz.

Based on this possible implementation, a transmit power of each subcarrier may reach a maximum value by enabling a quantity of subcarriers of each MHz to be the same.

Figure 7:
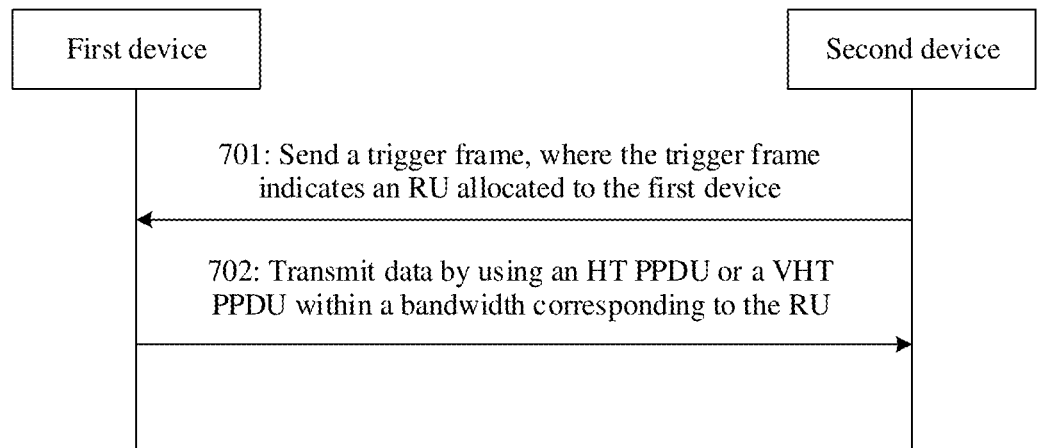
FIG. 7 is a schematic flowchart of another example data transmission method according to an embodiment of this application.

FIG. 7 is a schematic flowchart of an example data transmission method according to an embodiment of this application. As shown in FIG. 7, the method applied to data transmission includes the following step 701 and step 702. The method shown in FIG. 7 may be performed by a first device and a second device. Alternatively, the method shown in FIG. 7 may be performed by a chip in the first device and a chip in the second device. FIG. 7 is described by using an example in which the first device and the second device are execution bodies.

701: The second device sends a trigger frame, where the trigger frame indicates an RU allocated to the first device. Correspondingly, the first device may receive the trigger frame.

702: The first device transmits data by using a high throughput PHY protocol data unit (HT PPDU) or very high throughput presentation protocol data unit (VHT PPDU) within a bandwidth corresponding to the RU. Correspondingly, the second device may receive, within the bandwidth corresponding to the RU, the data sent by the first device by using the HT PPDU or the VHT PPDU.

Based on the method described in FIG. 7, the transmit power of a subcarrier can be increased, and the transmission performance can be ensured.

Figure 8:
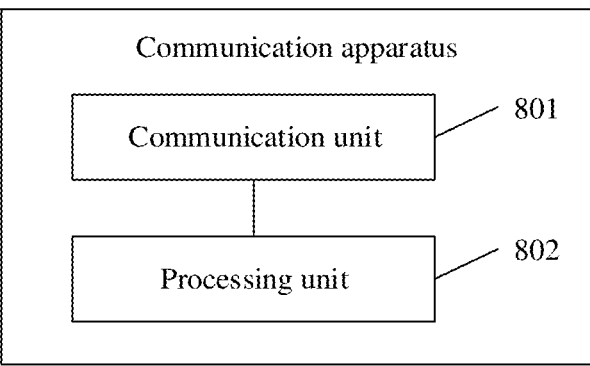
FIG. 8 is a schematic diagram of a structure of an example communication apparatus according to an embodiment of this application.

FIG. 8 is a schematic diagram of a structure of an example communication apparatus according to an embodiment of this application. The communication apparatus shown in FIG. 8 may be configured to perform some or all functions of the first device in the method embodiment described in FIG. 2. The apparatus may be the first device, or may be an apparatus in the first device, or may be an apparatus that can be used in a matching manner with the first device. The communication apparatus may alternatively be a chip system. The communication apparatus shown in FIG. 8 may include a communication unit 801 and a processing unit 802. The processing unit 802 is configured to perform data processing. A receiving unit and a sending unit are integrated into the communication unit 801. The communication unit 801 may alternatively be referred to as a transceiver unit. Alternatively, the communication unit 801 may be split into the receiving unit and the sending unit. The processing unit 802 and the communication unit 801 below are similar.

The communication unit 801 is configured to receive a trigger frame, where the trigger frame indicates a resource unit (RU) allocated to the first device. The communication unit 801 is further configured to send first data to a second device, where the first data occupies a discrete subcarrier in an RU.

In a possible implementation, a manner in which the communication unit 801 sends the first data to the second device is specifically as follows: dividing the first data into M data sub-blocks, where M is greater than 1, M is less than N, and N is a quantity of subcarriers in the RU; mapping each of the M data sub-blocks to K discrete subcarriers in the RU respectively, to obtain subcarrier data corresponding to the M data sub-blocks, where K is equal to N divided by M; performing inverse fast Fourier transform IFFT on the subcarrier data corresponding to the M data sub-blocks, to obtain M pieces of first time-domain data; and sending the M pieces of first time-domain data.

In a possible implementation, a manner in which the communication unit 801 sends the first data to the second device is specifically as follows: dividing the first data into M data sub-blocks, where M is greater than 1, M is less than N, and N is a quantity of subcarriers in the RU; mapping each of the M data sub-blocks to K discrete subcarriers in the RU respectively, to obtain subcarrier data corresponding to the M data sub-blocks, where K is equal to N divided by M; performing inverse fast Fourier transform IFFT on the subcarrier data corresponding to the M data sub-blocks, to obtain M pieces of first time-domain data; dividing each of the M pieces of first time-domain data into blocks, where each piece of first time-domain data corresponds to M data blocks; obtaining M pieces of second time-domain data based on data blocks corresponding to the M pieces of first time-domain data, where an $i^{th}$ piece of second time-domain data in the M pieces of second time-domain data is obtained by combining an $i^{th}$ data block of each piece of first time-domain data, and i is greater than 0 and less than or equal to M; and sending the M pieces of second time-domain data.

In a possible implementation, the M data sub-blocks include a first data sub-block and a second data sub-block, and the first data sub-block and the second data sub-block are mapped to different K subcarriers.

In a possible implementation, all of the M data sub-blocks are mapped to same K subcarriers, and the K subcarriers are subcarriers with best channel quality in the RU.

In a possible implementation, the RU is allocated to a plurality of first devices, and data sent by different first devices occupies different K subcarriers in the RU.

In a possible implementation, the trigger frame further indicates a subcarrier set occupied by the first device for sending the first data.

In a possible implementation, in a bandwidth corresponding to the RU, any consecutive 1-megahertz bandwidth includes a same quantity of subcarriers in the K subcarriers.

In another example embodiment, the communication apparatus shown in FIG. 8 may be configured to perform some or all functions of the second device in the method embodiment described in FIG. 2. The apparatus may be the second device, or may be an apparatus in the second device, or may be an apparatus that can be used in a matching manner with the second device. The communication apparatus may alternatively be a chip system. The communication apparatus shown in FIG. 8 may include a communication unit 801 and a processing unit 802.

The communication unit 801 is configured to send a trigger frame, where the trigger frame indicates a resource unit (RU) allocated to a first device. The communication unit

801 is further configured to receive the first data sent by the first device, where the first data occupies a discrete subcarrier in the RU.

In a possible implementation, a manner in which the communication unit 801 receives the first data sent by the first device is specifically as follows: receiving M pieces of first time-domain data from the first device; performing fast Fourier transform (FFT) on the M pieces of first time-domain data, to obtain subcarrier data corresponding to M data sub-blocks of the first data; and obtaining the M data sub-blocks based on the subcarrier data corresponding to the M data sub-blocks.

In a possible implementation, a manner in which the communication unit 801 receives the first data sent by the first device is specifically as follows: receiving M pieces of second time-domain data from the first device; dividing each of the M pieces of second time-domain data into blocks, where each piece of second time-domain data corresponds to M data blocks; obtaining M pieces of first time-domain data based on data blocks corresponding to the M pieces of second time-domain data, where an $i^{th}$ piece of first time-domain data in the M pieces of first time-domain data is obtained by combining an $i^{th}$ data block of each piece of second time-domain data, and i is greater than 0 and less than or equal to M; performing fast Fourier transform (FFT) on the M pieces of first time-domain data, to obtain subcarrier data corresponding to the M data sub-blocks of the first data; and obtaining the M data sub-blocks based on the subcarrier data corresponding to the M data sub-blocks.

In a possible implementation, the M data sub-blocks include a first data sub-block and a second data sub-block, and the first data sub-block and the second data sub-block are mapped to different K subcarriers.

In a possible implementation, all of the M data sub-blocks are mapped to same K subcarriers, and the K subcarriers are subcarriers with best channel quality in the RU.

In a possible implementation, the RU is allocated to a plurality of first devices, and data sent by different first devices occupies different K subcarriers in the RU.

In a possible implementation, the trigger frame further indicates a subcarrier set occupied by the first device for sending the first data.

In a possible implementation, in a bandwidth corresponding to the RU, a same quantity of subcarriers in the K subcarriers is included in any consecutive 1-megahertz bandwidth.

In still another example embodiment, the communication apparatus shown in FIG. 8 may be configured to perform some or all functions of the first device in the method embodiment described in FIG. 7. The apparatus may be the first device, or may be an apparatus in the first device, or may be an apparatus that can be used in a matching manner with the first device. The communication apparatus may alternatively be a chip system. The communication apparatus shown in FIG. 8 may include a communication unit 801 and a processing unit 802.

The communication unit 801 is configured to receive a trigger frame, where the trigger frame indicates a resource unit (RU) allocated to the first device. The communication unit 801 is further configured to transmit data within a bandwidth corresponding to the RU by using an HT PPDU or a VHT PPDU.

In still another example embodiment, the communication apparatus shown in FIG. 8 may be configured to perform some or all functions of the second device in the method embodiment described in FIG. 7. The apparatus may be the second device, or may be an apparatus in the second device, or may be an apparatus that can be used in a matching manner with the second device. The communication apparatus may alternatively be a chip system. The communication apparatus shown in FIG. 8 may include a communication unit 801 and a processing unit 802.

The communication unit 801 is configured to send a trigger frame, where the trigger frame indicates a resource unit (RU) allocated to a first device.

The communication unit 801 is further configured to receive data sent by the first device by using an HT PPDU or a VHT PPDU within a bandwidth corresponding to the RU.

Figures 9, 10:
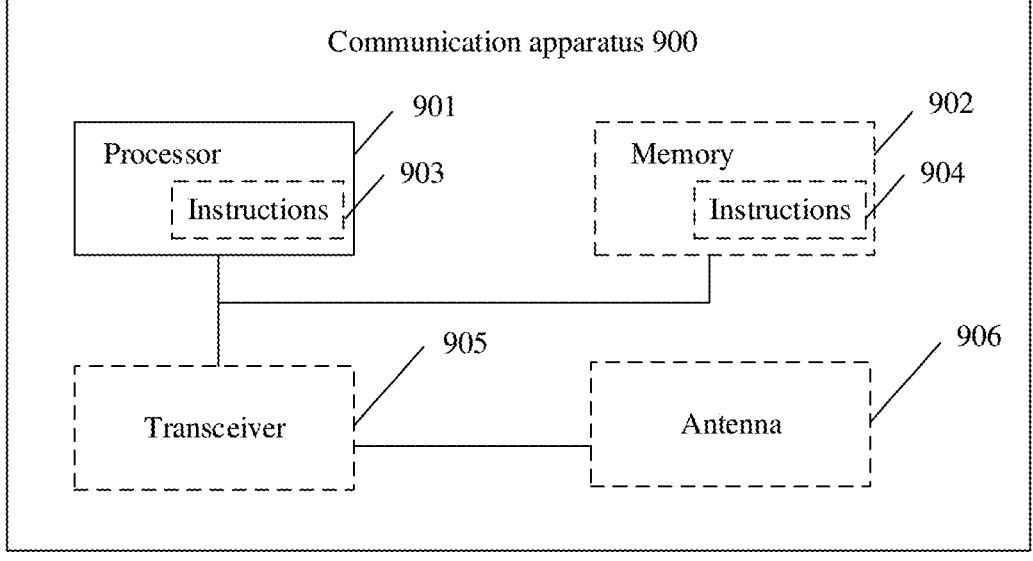
FIG. 9 is a schematic diagram of a structure of another example communication apparatus according to an embodiment of this application.
FIG. 10 is a schematic diagram of a structure of an example chip according to an embodiment of this application.

FIG. 9 is a schematic diagram of a structure of an example communication apparatus. The communication apparatus 900 may be the first device in the foregoing method embodiment, or may be the second device in the foregoing method embodiment. Alternatively, the communication apparatus may be a chip, a chip system, a processor, or the like that supports the first device in implementing the foregoing method, or may be a chip, a chip system, a processor, or the like that supports the second device in implementing the foregoing method. The communication apparatus may be configured to implement the methods described in the foregoing method embodiments. For details, refer to the descriptions in the foregoing method embodiments.

The communication apparatus 900 may include one or more processors 901. The processor 901 may be a general-purpose processor, a dedicated processor, or the like. For example, the processor 901 may be a baseband processor or a central processor. The baseband processor may be configured to process a communication protocol and communication data. The central processor may be configured to control a communication apparatus (for example, a base station, a baseband chip, a terminal, a terminal chip, a DU, or a CU), execute a software program, and process data of the software program.

Optionally, the communication apparatus 900 may include one or more memories 902. The memory 902 may store instructions 904, and the instructions may be run on the processor 901, so that the communication apparatus 900 performs the methods described in the foregoing method embodiments. Optionally, the memory 902 may further store data. The processor 901 and the memory 902 may be disposed separately, or may be integrated together.

Optionally, the communication apparatus 900 may further include a transceiver 905 and an antenna 906. The transceiver 905 may be referred to as a transceiver unit, a transceiver machine, a transceiver circuit, or the like, and is configured to implement a transceiver function. The transceiver 905 may include a receiver and a transmitter. The receiver may be referred to as a receiver machine, a receiving circuit, or the like, and is configured to implement a receiving function. The transmitter may be referred to as a transmitter machine, a transmitter circuit, or the like, and is configured to implement a sending function.

The communication apparatus 900 is the first device. The processor 901 is configured to perform a data processing operation of the first device in the foregoing method embodiment. The transceiver 905 is configured to perform data receiving and sending operations of the first device in the foregoing method embodiment.

The communication apparatus 900 is a second device. The processor 901 is configured to perform a data processing operation of the second device in the foregoing method embodiment. The transceiver 905 is configured to perform data receiving and sending operations of the second device in the foregoing method embodiment.

In another possible design, the processor 901 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, optionally, the processor 901 may store instructions 903, and the instructions 903 are run on the processor 901, to enable the communication apparatus 900 to perform the method described in the foregoing method embodiment. The instructions 903 may be fixed in the processor 901. In this case, the processor 901 may be implemented by hardware.

In still another possible design, the communication apparatus 900 may include a circuit. The circuit may implement a sending, receiving, or communication function in the foregoing method embodiment. The processor and the transceiver that are described in this embodiment of this application may be implemented on an integrated circuit (IC), an analog IC, a radio frequency integrated circuit RFIC, a mixed-signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal-oxide-semiconductor (nMetal-oxide-semiconductor, NMOS), a P-type metal-oxide-semiconductor (positive channel metal oxide semiconductor, PMOS), a bipolar junction transistor (BJT), a bipolar CMOS (BiCMOS), silicon germanium (SiGe), and gallium arsenide (GaAs).

The communication apparatus described in the foregoing embodiment may be the first device or the second device. However, a range of the communication apparatus described in this application is not limited thereto, and a structure of the communication apparatus may not be limited to FIG. 9. The communication apparatus may be an independent device or may be a part of a large device. For example, the communication apparatus may be:

(1) an independent integrated circuit IC, a chip, or a chip system or subsystem;

(2) a set of one or more ICs, where optionally, the IC set may also include a storage component configured to store data and instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a second device, a cloud device, an artificial intelligence device, or the like; or (6) others.

When the communication apparatus may be a chip or a chip system, refer to a schematic diagram of a structure of an example chip shown in FIG. 10. The chip shown in FIG. 10 includes a processor 1001 and an interface 1002. Optionally, the chip may further include a memory 1003. There may be one or more processors 1001, and there may be a plurality of interfaces 1002.

In a design, for a case in which the chip is configured to implement the function of the first device in the method embodiment of this application:

the interface 1002 is configured to receive or output a signal; and the processor 1001 is configured to perform a data processing operation of the first device in the foregoing method embodiment.

In another design, for a case in which the chip is configured to implement the function of the second device in the method embodiment of this application:

the interface 1002 is configured to receive or output a signal; and the processor 1001 is configured to perform a data processing operation of the second device in the foregoing method embodiment.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the communication apparatus provided in embodiments of this application may also implement these features or functions.

It should be understood that, the processor in embodiments of this application may be an integrated circuit chip, and has a signal processing capability. In an implementation process, the steps in the foregoing method embodiment may be completed by an integrated logic circuit in a form of hardware or instructions in a form of software in the processor. The foregoing processor may be a general purpose processor, a digital signal processor (DSP), an application-specific integrated circuit (ASIC), a field-programmable gate array (FPGA) or another programmable logic device, a discrete gate or a transistor logic device, or a discrete hardware component.

It may be understood that, in embodiments of this application, the memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By using an example description but not a restrictive description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any other proper types of memories.

An embodiment of this application further provides a computer-readable storage medium. The computer-readable storage medium stores instructions. When the instructions are run on a processor, method procedures in the foregoing method embodiment are implemented.

An embodiment of this application further provides a computer program product. When the computer program product runs on a processor, method procedures in the foregoing method embodiment are implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by a first device, a trigger frame indicating a resource unit (RU) allocated to the first device; and
sending, by the first device, first data to a second device, wherein the first data occupies a discrete subcarrier in the RU,
wherein the sending of the first data to the second device comprises:
dividing, by the first device, the first data into M data sub-blocks, wherein M is greater than 1, M is less than N, and N is a quantity of subcarriers in the RU;
mapping, by the first device, each of the M data sub-blocks to K discrete subcarriers in the RU respectively, to obtain subcarrier data corresponding to the M data sub-blocks, wherein K is equal to N divided by M,
performing, by the first device, inverse fast Fourier transform (IFFT) on the subcarrier data corresponding to the M data sub-blocks, to obtain M pieces of first time-domain data; and
dividing, by the first device, each of the M pieces of first time-domain data into blocks, wherein each piece of first time-domain data corresponds to M data blocks;
obtaining, by the first device, M pieces of second time-domain data based on data blocks corresponding to the M pieces of first time-domain data, wherein an $i^{th}$ piece of second time-domain data in the M pieces of second time-domain data is obtained by combining an $i^{th}$ data block of each piece of first time-domain data, and i is greater than 0 and less than or equal to M; and
sending, by the first device, the M pieces of second time-domain data.

2. The method according to claim 1, wherein the M data sub-blocks comprise a first data sub-block and a second data sub-block, and the first data sub-block and the second data sub-block are mapped to different K subcarriers.

3. The method according to claim 1, wherein all of the M data sub-blocks are mapped to same K subcarriers, and the K subcarriers are subcarriers with best channel quality in the RU.

4. The method according to claim 1, wherein the RU is allocated to a plurality of first devices, and data sent by different first devices occupies different K subcarriers in the RU.

5. The method according to claim 4, wherein the trigger frame further indicates a subcarrier set occupied by the first device for sending the first data.

6. A first device, comprising at least one processor, wherein the at least one processor is coupled to a memory storing instructions that, when executed by the at least one processor, enable the first device to perform operations comprising:
receiving a trigger frame indicating a resource unit (RU) allocated to the first device; and
sending first data to a second device, wherein the first data occupies a discrete subcarrier in the RU,
wherein the sending of the first data to the second device comprises:
dividing the first data into M data sub-blocks, wherein M is greater than 1, M is less than N, and N is a quantity of subcarriers in the RU;
mapping each of the M data sub-blocks to K discrete subcarriers in the RU respectively, to obtain subcarrier data corresponding to the M data sub-blocks, wherein K is equal to N divided by M;
performing inverse fast Fourier transform (IFFT) on the subcarrier data corresponding to the M data sub-blocks, to obtain M pieces of first time-domain data; and
dividing each of the M pieces of first time-domain data into blocks, wherein each piece of first time-domain data corresponds to M data blocks;
obtaining M pieces of second time-domain data based on data blocks corresponding to the M pieces of first time-domain data, wherein an $i^{th}$ piece of second time-domain data in the M pieces of second time-domain data is obtained by combining an $i^{th}$ data block of each piece of first time-domain data, and i is greater than 0 and less than or equal to M; and
sending the M pieces of second time-domain data.

7. The first device according to claim 6, wherein the M data sub-blocks comprise a first data sub-block and a second data sub-block, and the first data sub-block and the second data sub-block are mapped to different K subcarriers.

8. The first device according to claim 6, wherein all of the M data sub-blocks are mapped to same K subcarriers, and the K subcarriers are subcarriers with best channel quality in the RU.

9. The first device according to claim 6, wherein the RU is allocated to a plurality of first devices, and data sent by different first devices occupies different K subcarriers in the RU.

10. A second device, comprising at least one processor, wherein the processor is coupled to a memory storing instructions that, when executed by the at least one processor, enable the second device to perform operations comprising:

sending a trigger frame, wherein the trigger frame indicates a resource unit (RU) allocated to a first device; and receiving first data sent by the first device, wherein the first data occupies a discrete subcarrier in the RU, wherein the receiving of the first data sent by the first device comprises:

receiving M pieces of second time-domain data from the first device;

dividing each of the M pieces of second time-domain data into blocks, wherein each piece of second time-domain data corresponds to M data blocks;

obtaining M pieces of first time-domain data based on data blocks corresponding to the M pieces of second time-domain data, wherein an $i^{th}$ piece of first time-domain data in the M pieces of first time-domain data is obtained by combining an $i^{th}$ data block of each piece of second time-domain data, and i is greater than 0 and less than or equal to M;

performing fast Fourier transform (FFT) on the M pieces of first time-domain data, to obtain subcarrier data corresponding to M data sub-blocks of the first data; and obtaining the M data sub-blocks of the first data based on the subcarrier data corresponding to the M data sub-blocks.

11. The second device according to claim 10, wherein the M data sub-blocks of the first data comprise a first data sub-block and a second data sub-block, and the first data sub-block and the second data sub-block are mapped to different K subcarriers.

12. The second device according to claim 10, wherein all of the M data sub-blocks of the first data are mapped to same K subcarriers, and the K subcarriers are subcarriers with best channel quality in the RU.

13. The second device according to claim 10, wherein the RU is allocated to a plurality of first devices, and data sent by different first devices occupies different K subcarriers in the RU.

* * * * *